Patented June 1, 1954

2,680,101

UNITED STATES PATENT OFFICE 2,680,101

STABLE ARTIFICIAL RESIN EMULSIONS AND PROCESS OF MAKING SAME UTILIZING REACTION PRODUCT OF A PROTEIN

Luzius Schibler, Riehen, and Andreas Laely, Basel, Switzerland, assignors to Ciba Limited, Basel, Switzerland, a Swiss firm No Drawing. Application August 27, 1951, Serial No. 243,916

Claims priority, application Switzerland September 8, 1950

24 Claims. (Cl. 260—6)

It is known that by additive combination with alkylene oxides, especially ethylene oxide, substances which are insoluble or have limited solubility can be rendered soluble in water. It is also known that aqueous solutions of protein substances, which are irreversibly gelatinisable by reaction with formaldehyde, after they have been reacted with ethylene oxide or propylene oxide are insensitive to formaldehyde even in high concentration. It has been shown that solutions of protein substances reacted with alkylene oxides which have been mixed with formaldehyde have also lost their capability of being hardened, that is to say that after being dried, even at high temperatures, they no longer produce adhesive effects of adequate resistance to water. Furthermore, such mixtures contain large amounts of free formaldehyde, which cannot enter into additive combination and therefore escape unconsumed upon drying. These preparations therefore have only a relatively small field of application.

The present invention is based on the observation that emulsions of the oil-in-water type can be made by emulsifying in an aqueous medium a solution of a hardenable water-insoluble artificial resin in an organic solvent which is substantially immiscible with water, if the aqueous medium contains a reaction product of a protein with an alkylene oxide.

As hardenable water-insoluble artificial resins there come into consideration artificial resins soluble in organic solvents, such as phenoplasts and especially methylol compounds of substances of amide character capable of forming a hardenable aminoplast with formaldehyde, in which methylol compounds the oxygen atom of at least one methylol group is bound to an organic residue having more than three carbon atoms.

As substances of amide character capable of forming a hardenable aminoplast with formaldehyde there may be mentioned, urea, thiourea, guanidine, biuret, dicyandiamide, and also amino triazines which contain at least two primary amino groups capable of reacting with formaldehyde, for example, melamine, benzoguanamine, acetoguanamine and formoguanamine.

These methylol compounds may be methylol ethers such as are obtained in known manner, for example, by subjecting condensation products of formaldehyde and substances of amide character capable of forming a hardenable aminoplast with formaldehyde to etherification with an alcohol, which is substantially immiscible with water, for example, butyl alcohol, amyl alcohol, hexyl alcohol, cyclohexanol, octadecyl alcohol or benzyl alcohol. In the present process there is generally used a solution of the methylol ether in an excess of the etherifying alcohol such as results from the process of etherification. To these solutions may, if desired after being freed to a great extent from the excess of etherifying alcohol, be added the water-insoluble organic solvents mentioned below.

Alternatively there may be used methylol esters which can be obtained in known manner, for example, in the case of melamine by reacting the methylol ether, advantageously the methylol methyl ether, with a carboxylic acid containing more than 8 carbon atoms such as pelargonic acid, lauric acid, myristic acid, oleic acid, cerotic acid, stearic acid, fatty acid second runnings and colophony.

As organic solvents which are substantially immiscible with water there may be used, on the one hand, the alcohols mentioned above or, on the other hand, water-insoluble organic solvents, for example, extraction benzine or lacquer benzine, xylene, toluene, chlorobenzene, tetrahydronaphthalene or "White spirit," or wax-like substances which are solid at ordinary temperatures, for example, paraffin wax, with which the hardenable artificial resin to be used forms with the aid of heat more or less homogeneous solutions or melts. There may also be used mixtures of the above mentioned solvents.

As the proteins of which the reaction products with an alkylene oxide are used as emulsifying agents, there may be mentioned for example, fish glue, soya casein, milk casein, lactalbumen-free acid casein, gelatine or the like, and as alkylene oxides there are to be understood more especially alkylene oxides of low molecular weight having an oxirane ring and of at most 5 carbon atoms, and preferably not more than 3 carbon atoms, such as ethylene oxide, propylene oxide, epichlorhydrin and like compounds.

For preparing the aqueous phase the protein is reacted in known manner with the alkylene oxide. Advantageously the protein is dissolved in water with the aid of a basic substance, such as sodium hydroxide, potassium hydroxide, ammonia, triethanolamine, morpholine, cyclohexylamine, borax, sodium carbonate, trisodium phosphate or the like, and the alkylene oxide is added to the resulting solution, if desired at a moderately raised temperature and preferably while stirring. If the alkylene oxide is gaseous, as for example, in the case of ethylene oxide, it is of advantage to pass it directly into the protein solution. The alkylene oxide may alternatively be added in the form of an aqueous solution thereof. In the case of epichlorhydrin it is of advantage to add it in the form of an alcoholic solution to the protein solution. The alkylene oxide is preferably added to the protein solution in such a proportion that after the reaction, that is to say, for example, after allowing the reaction mixture to stand for 24–48 hours, irreversible gelatinisation no longer occurs after the addition of formaldehyde.

The resulting solution of the reaction product of the alkylene oxide and protein can be used as the aqueous phase directly or after being diluted with water to the desired viscosity.

The preparation of the artificial resin emulsions is carried out in known manner by placing the aqueous phase in a suitable emulsifying apparatus, and slowly adding the solution of the artificial resin, advantageously of an aminoplast, to the aqueous phase while stirring. If desired the emulsification may be carried out at a raised temperature, whereby the viscosity of the resin solution to be emulsified can be regulated. Emulsification at a raised temperature is especially recommended when a more or less homogeneous molten mixture of artificial resin and a wax-like substance such as paraffin wax is to be emulsified.

The artificial resin emulsions so obtained are capable of dilution with water to any desired extent. Upon drying they leave behind a film which, after being heated, is surprisingly resistant to water, notwithstanding that the reaction product of the protein and alkylene oxide, as already stated, is no longer hardened by the formaldehyde liberated from the artificial resin.

Especially water-resistant effects are obtained by using an aminoplast emulsion to which has been added before use a hardening catalyst, for example, formic acid or ammonium thiocyanate. Since the catalyst is in the external aqueous phase and the resin in the internal oily phase, the catalyst has no marked effect in the liquid emulsion so that the latter is remarkably stable. When, however, the dried binding agent is heated to a temperature of 90–150° C., the artificial resin undergoes hardening and a water-resistant film is formed, in which the protein treated with alkylene oxide has lost its emulsifying action.

The new artificial resin emulsions may be thickened by the addition of a thickening agent, that is to say, a substance capable of forming highly viscous colloidal solutions, for example, gum tragacanth, starch, methyl-cellulose, polyvinyl alcohol or the like. An especially advantageous method of thickening emulsions suitable for certain purposes in improving textiles consists in subsequently emulsifying therein an organic water-immiscible solvent, for example, extraction or heavy benzine, lacquer benzine, "White spirit," benzene, chlorobenzene, toluene, xylene, solvent naphtha, tetrahydronaphthalene, tripentene, turpentine, trichlorethylene or the like whereby 3-phase artificial resin emulsions may, if desired, be obtained.

The artificial resin emulsions may, if desired, be converted by a suitable evaporation process advantageously under reduced pressure, into pulverulent preparations which can easily be redispersed in the presence of water. This is especially the case with those artificial resin emulsions in which the content of dry substance in the external phase exceeds the content of dry substance, that is to say the resin, in the internal phase.

The new artificial resin emulsions can be used for a very wide variety of purposes, for example, as adhesives in the paper, leather, textile and wood industries or as impregnating agents for fibrous materials, such for example, as textiles and paper, or for fixing pigments on textile fabrics.

The following examples illustrate the invention, the parts and percentages being by weight:

Example 1

1000 parts of fish glue having a dry content of about 50 per cent. are adjusted to a pH value of 9.5 by means of ammonia and 50 parts of ethylene oxide are introduced, while stirring. 80 parts of the resulting thick condensation product are diluted with 140 parts of water and 280 parts of a solution in butyl alcohol of about 60 per cent. strength of a condensation product of melamine and formaldehyde etherified with butyl alcohol, which solution contains 2.75 per cent. of free formaldehyde, are emulsified in the aqueous medium in a suitable apparatus. The resulting mobile viscous emulsion is mixed with formic acid until it has an acid reaction, and is used for glueing wood, paper and the like. After drying there is obtained a water-resistant bond.

Example 2

200 parts of gelatine are dissolved in 800 parts of warm water and the solution is rendered alkaline with ammonia until a test portion diluted with an equal quantity of water has a pH value of 8.7. 40 parts of ethylene oxide are then introduced, while stirring, at a temperature of 30° C. A thinly liquid reaction mixture is obtained which does not gelatinise even after prolonged standing. If formaldehyde is added to a test portion of the solution after 48 hours no further coagulation occurs.

100 parts of this reaction mixture, which is no longer sensitive to formaldehyde, are placed in an emulsifying apparatus and 120 parts of a solution of 60 percent. strength in butyl alcohol of a urea-formaldehyde condensation product etherfied with butanol are introduced in small portions. In this manner there is obtained a homogeneous mobile emulsion of the oil-in-water type. It can be used in the same manner as the emulsion of Example 1.

Example 3

200 parts of acid casein are added to a solution of 12 parts of borax in 788 parts of hot water. The solution is stirred until cold. After the addition of 14 parts of an ammonia solution of 25 per cent. strength, 60 parts of ethylene oxide are introduced in the course of 1 hour.

In 100 parts of the resulting viscous emulsifier solution are emulsified 41 parts of the artificial resin solution described in Example 2, the latter forming the internal phase and the solution of casein reacted with ethylene oxide forming the external phase. A thick white salve is obtained, which may be dried in vacuo at 50° C. The dry product, after being ground, is a stable powder which is easily dispersable in water and after being pasted with water serves as a binding agent or an adhesive.

Example 4

5 to 20 parts of a solution of 51 per cent. strength in cyclohexylalcohol of a urea-formaldehyde condensation product etherfied with cyclohexyl alcohol are slowly introduced into 10 parts of the viscous emulsifier solution described in Example 3. The resin solution may contain up to 2.5 per cent. of free formaldehyde. Depending on the quantity of the resin solution emulsified in the aqueous phase there is obtained a thinly viscous to salve-like emulsion which, especially in the latter case, is of good stability and dries to form glass-clear films. It is suitable for many purposes, for example as a hardenable binding agent or adhesive.

Instead of ethylene oxide there may be used, for example, a corresponding quantity of propylene oxide.

*Example 5*

100 parts of acid casein are dissolved in 388 parts of water with the addition of 12 parts of ammonia solution of 25 per cent. strength. 30 grams of ethylene oxide are passed into the resulting solution, while stirring. The mixture is then diluted with 495 parts of water. In the resulting emulsifier solution there are slowly emulsified 1320 parts of the solution of the condensation product of melamine and formaldehyde etherified with butyl alcohol, which is described in Example 1. A thick salve-like resin emulsion is obtained, which is capable of dilution to any desired extent with water, and which may be freed from a part of the butanol content therein by evaporation in vacuo. This product, even after the addition of a hardening catalyst such as ammonium thiocyanate, is stable and may advantageously be used for fixing pigments on textile fabrics in the following manner:

440 parts of a pigment-resin suspension are prepared by finely dispersing 30 parts of copper phthalocyanine pigment in a mixture of 76 parts of the above described emulsifier solution prior to dilution with water and 9 parts of a highly sulfonated castor oil. The resulting pigment suspension is diluted with 117 parts of water, then mixed with 200 parts of the resin emulsion described above and 8 parts of ammonium thiocyanate are added as a hardening catalyst.

There is also produced as a thickening agent an emulsion (a so-called emulsion thickener) by diluting 60 parts of the above described undiluted emulsifier solution with 165 parts of water, and adding 25 parts of ethylene glycol, and then emulsifying in the resulting mixture 750 parts of benzine having a boiling range of 100–140° C. There is obtained a thick salve-like mass of which the external phase contains in solution casein reacted with ethylene oxide, and of which the internal phase consists of benzine. To 560 parts of this so-called emulsion thickener the 440 parts of the pigment-resin suspension described above are added, and the mixture is homogenised to form a viscous printing color.

A cotton fabric, after being printed with this printing color, and then heated for 5 minutes at 140° C., has a water-resistant print which does not stiffen the fabric. The fixation may be completed by neutral or acid steaming.

*Example 6*

Into an aqueous solution containing 20 per cent. of casein and 2.4 per cent. of borax and rendered slightly alkaline with ammonia ethylene oxide is introduced until the mixture has taken up 30 parts of ethylene oxide for every 100 parts of casein. After 24 hours, 68 parts of the resulting reaction mixture are diluted with 32 parts of water, and in this diluted reaction mixture there is emulsified a molten mixture of 83.5 parts of paraffin wax melting at 52° C. and 83.5 parts of a condensation product obtained by condensing about 2 mols of stearic acid (per mol of melamine) with a condensation product of 1 mol of melamine and 4–6 mols of formaldehyde highly etherified with methyl alcohol. After dilution with 33 parts of water there is obtained a finely dispersed salve-like stable emulsion, which can be used as an impregnating agent for textiles, paper and the like.

*Example 7*

1000 parts of fish glue having a dry content of about 50 per cent, are adjusted to a pH value of 8.6 with ammonia, and then mixed, while stirring with a solution of 200 parts of epichlorhydrin in 200 parts of ethyl alcohol. After 16 hours, 110 parts of this thick reaction mixture are diluted with 140 parts of water, and 280 parts of a solution of about 60 per cent strength in butyl alcohol of a melamine-formaldehyde condensation product etherified with butyl alcohol, said solution containing 2.75 per cent of free formaldehyde, are emulsified in the mixture in a suitable apparatus. The resulting viscous emulsion is mixed with formic acid until it has an acid reaction, and is used for glueing wood, paper or the like. After drying, a water-resistant bond is obtained.

*Example 8*

200 parts of gelatine are dissolved in 800 parts of warm water and the solution is rendered alkaline with ammonia until a test portion diluted with an equal quantity of water has a pH value of 8.8. A solution of 160 parts of epichlorhydrin in 160 parts of alcohol is stirred in, whereby a thinly liquid solution is obtained which does not gelatinise even after prolonged standing. When formaldehyde is added to the solution after several days coagulation no longer occurs.

To 100 parts of this aqueous phase, which is no longer sensitive to formaldehyde, there are added in small portions in an emulsifying apparatus 120 parts of a solution of 60 per cent strength in butyl alcohol of a urea-formaldehyde condensation product etherified with butanol, whereby a homogeneous viscous emulsion of the oil-in-water type is obtained. It can be used in the same manner as the emulsion of Example 1.

What is claimed is:

1. A process for the manufacture of a stable aqueous emulsion of a hardenable water-insoluble organic solvent-soluble methylol compound of an aminoplast forming substance of amide character selected from the group consisting of urea, thiourea, guanadine, biuret, dicyandiamide and aminotriazines containing at least two primary amino groups capable of reacting with formaldehyde in which methylol compound the oxygen atom of at least one methylol group is bound to an organic residue selected from the group consisting of hydrocarbon radicals having more than 3 carbon atoms and acyl groups of a fatty acid having more than 8 carbon atoms and which methylol compound is dissolved in an organic solvent which is substantially immiscible with water, which process comprises emulsifying the solution of the methylol compound in an aqueous alkaline medium containing an alkaline soluble reaction product of a protein with a compound of at most 5 carbon atoms having an oxirane ring.

2. A process for the manufacture of a stable aqueous emulsion of a hardenable water-insoluble organic solvent-soluble methylol compound of an aminoplast forming substance of amide character selected from the group consisting of urea, thiourea, guanidine, biuret, dicyandiamide and aminotriazines containing at least two primary amino groups capable of reacting with formaldehyde, in which methylol compound the oxygen atom of at least one methylol group is bound to an organic residue selected from the group consisting of hydrocarbon radicals having more than 3 carbon atoms and acyl groups of a fatty acid having more than 8 carbon atoms and which methylol compound is dissolved in an organic solvent substantially immiscible with water, which process comprises emulsifying the solution of the methylol compound in an aqueous alkaline medium containing an alkaline-soluble reaction product of a protein with a 1,2-epoxy compound selected from the group consisting of ethylene oxide, propylene oxide and epichlorhydrin.

3. A process for the manufacture of a stable aqueous emulsion of a hardenable water-insoluble organic solvent-soluble methylol compound of urea in which methylol compound the oxygen atom of at least one methylol group is bound to a hydrocarbon radical having more than 3 carbon atoms and which methylol compound is dissolved in an organic solvent substantially immiscible with water, which process comprises emulsifying the solution of the methyol compound in an aqueous alkaline medium containing an alkaline-soluble reaction product of a protein with a 1,2-epoxy compound selected from the group consisting of ethylene oxide, propylene oxide and epichlorhydrin.

4. A process for the manufacture of a stable aqueous emulsion of a hardenable water-insoluble organic solvent-soluble methylol compound of urea in which methylol compound the oxygen atom of at least one methylol group is bound to a hydrocarbon radical having more than 3 carbon atoms and which methylol compound is dissolved in an alcohol having more than 3 carbon atoms and being substantially immiscible with water, which process comprises emulisfying the solution of the methylol compound in an aqueous alkaline medium containing an alkaline-soluble reaction product of a protein with a 1,2-epoxy compound selected from the group consisting of ethylene oxide, propylene oxide and epichlorhydrin.

5. A process for the manufacture of a stable aqueous emulsion of a hardenable water-insoluble organic solvent-soluble methylol compound of urea in which methylol compound the oxygen atom of at least one methylol group is bound to a hydrocarbon radical having more than 3 carbon atoms and which methylol compound is dissolved in an organic solvent substantially immiscible with water, which process comprises emulsifying the solution of the methylol compound in an aqueous alkaline medium containing a alkaline-soluble reaction product of acid casein with ethylene oxide.

6. A process for the manufacture of a stable aqueous emulsion of a hardenable water-insoluble organic solvent-soluble methylol compound of melamine in which methylol compound the oxygen atom of at least one methylol group is bound to an organic residue selected from the group consisting of hydrocarbon radicals having more than 3 carbon atoms and acyl groups of a fatty acid having more than 8 carbon atoms and which methylol compound is dissolved in an organic solvent substantially immiscible with water, which process comprises emulsifying the solution of the methylol compound in an aqueous alkaline medium containing a alkaline-soluble reaction product of a protein with a 1,2-epoxy compound selected from the group consisting of ethylene oxide, propylene oxide and epichlorhydrin.

7. A process for the manufacture of a stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an organic solvent substantially immiscible with water, which process comprises emulsifying the solution of the methylol compound in an aqueous alkaline medium containing a alkaline-soluble reaction product of a protein with a 1,2-epoxy compound selected from the group consisting of ethylene oxide, propylene oxide and epichlorhydrin.

8. A process for the manufacture of a stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an alcohol having more than 3 carbon atoms and being substantially immiscible with water, which process comprises emulsifying the solution of the methylol compound in an aqueous alkaline medium which contains a alkaline-soluble reaction product of a protein with a 1,2-epoxy compound selected from the group consisting of ethylene oxide, propylene oxide and epichlorhydrin.

9. A process for the manufacture of a stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an organic solvent substantially immiscible with water, which process comprises emulsifying the solution of the methylol compound in an aqueous alkaline medium containing a alkaline-soluble reaction product of acid casein with ethylene oxide.

10. A process for the manufacture of a stable aqueous emulsion of a hardenable water-insoluble organic solvent-soluble methylol compound of melamine in which methylol compound the oxygen atom of at least one methylol group is bound to an acyl group of a fatty acid having more than 8 carbon atoms and which methylol compound is dissolved in an organic solvent substantially immiscible with water, which process comprises emulsifying the solution of the methylol compound in an aqueous alkaline medium containing alkaline-soluble reaction product of a protein with a 1,2-epoxy compound selected from the group consisting of ethylene oxide, propylene oxide and epichlorhydrin.

11. A process for the manufacture of a stable aqueous emulsion of a hardenable water-insoluble organic solvent-soluble methylol compound of melamine in which methylol compound the oxygen atom of at least one methylol group is bound to an acyl group of a fatty acid having more than 17 carbon atoms and which methylol compound is dissolved in an organic solvent substantially immiscible with water, which process comprises emulsifying the solution of the methylol compound in an aqueous alkaline medium containing a alkaline-soluble reaction product of a protein with a 1,2-epoxy compound selected from the group consisting of ethylene oxide, propylene oxide and epichlorhydrin.

12. A process for the manufacture of a stable aqueous emulsion of a hardenable water-insoluble organic solvent-soluble methylol compound of melamine in which methylol compound the oxygen atom of at least one methylol group is bound to an acyl group of a fatty acid having more than 17 carbon atoms and which methylol compound is dissolved in an organic solvent substantially immiscible with water, which process comprises emulsifying the solution of the methylol compound in an aqueous alkaline medium containing a alkaline-soluble reaction product of acid casein with ethylene oxide.

13. A stable aqueous emulsion of a solution, in a substantially water-immiscible organic solvent, of a water-insoluble organic solvent-soluble hardenable methylol compound of an aminoplast forming substance of amide character selected from the group consisting of urea, thiourea, guanadine, biuret, dicyandiamide and aminotriazines containing at least two primary amino groups capable of reacting with formaldehyde, in which methylol compound the oxygen atom of at least one metheylol group is bound to an organic residue selected from the group consisting of hydrocarbon radicals having more than 3 carbon atoms and acyl groups of a fatty acid having more than 8 carbon atoms in an aqueous alkaline medium containing a alkaline-soluble reaction product of a protein with a compound of at most 5 carbon atom having an oxirane ring.

14. A stable aqueous emulsion of a solution, in a substantially water-immiscible organic solvent, of a water-insoluble organic solvent-soluble hardenable methylol compound of an aminoplast forming substance of amide character selected from the group consisting of urea, thiourea, guanidine, biuret, dicyandiamide and aminotriazines containing at least two primary amino groups capable of reacting with formaldehyde in which methylol compound the oxygen atom of at least one methylol group is bound to an organic residue selected from the group consisting of hydrocarbon radicals having more than 3 carbon atoms and acyl groups of a fatty acid having more than 8 carbon atoms, in an aqueous alkaline medium containing a alkaline-soluble reaction product of a protein with a 1,2-epoxy compound selected from the group consisting of ethylene oxide, propylene oxide and epichlorhydrin.

15. A stable aqueous emulsion of a solution in a substantially water-immiscible organic solvent of a hardenable, organic solvent-soluble methylol compound of urea in which methylol compound the oxygen atom of at least one methylol group is bound to a hydrocarbon radical having more than 3 carbon atoms and which methylol compound is dissolved in an organic solvent substantially immiscible with water, the solution of the methylol compound emulsified in an aqueous alkaline medium containing a alkaline-soluble reaction product of a protein with a 1,2-epoxy compound selected from the group consisting of ethylene oxide, propylene oxide and epichlorhydrin.

16. A stable aqueous emulsion of a hardenable water-insoluble organic solvent-soluble methylol compound of urea in which methylol compound the oxygen atom of at least one methylol group is bound to a hydrocarbon radical having more than 3 carbon atoms and which methylol compound is dissolved in an alcohol having more than 3 carbon atoms and being substantially immiscible with water, the solution of the methylol compound emulsified in an aqueous alkaline medium containing a alkaline-soluble reaction product of a protein with a 1,2-epoxy compound selected from the group consisting of ethylene oxide, propylene oxide and epichlorhydrin.

17. A stable aqueous emulsion of a hardenable water-insoluble organic solvent-soluble methylol compound of urea in which methylol compound the oxygen atom of at least one methylol group is bound to a hydrocarbon radical having more than 3 carbon atoms and which methylol compound is dissolved in an organic solvent substantially immiscible with water, the solution of the methylol compound being emulsified in an aqueous alkaline medium containing a alkaline-soluble reaction product of acid casein with ethylene oxide.

18. A stable aqueous emulsion of a hardenable water-insoluble organic solvent-soluble methylol compound of melamine in which methylol compound the oxygen atom of at least one methylol group is bound to an organic residue selected from the group consisting of hydrocarbon radicals having more than 3 carbon atoms and acyl groups of a fatty acid having more than 8 carbon atoms and which methylol compound is dissolved in an organic solvent substantially immiscible with water, the solution of the methylol compound being emulsified in an aqueous alkaline medium containing a alkaline-soluble reaction product of a protein with a 1,2-epoxy compound selected from the group consisting of ethylene oxide, propylene oxide and epichlorhydrin.

19. A stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an organic solvent substantially immiscible with water, the solution of the methylol compound being emulsified in an aqueous alkaline medium containing a alkaline-soluble reaction product of a protein with a 1,2-epoxy compound selected from the group consisting of ethylene oxide, propylene oxide and epichlorhydrin.

20. A stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an alcohol having more than 3 carbon atoms and being substantially immiscible with water, the solution of the methylol compound being emulsified in an aqueous alkaline medium which contains an alkaline-soluble reaction product of a protein with a 1,2-epoxy compound selected from the group consisting of ethylene oxide, propylene oxide and epichlorhydrin.

21. A stable aqueous emulsion of a hardenable water-insoluble organic solvent-soluble methylol compound of melamine in which methylol compound the oxygen atom of at least one methylol group is bound to a hydrocarbon radical having more than 3 carbon atoms and which methylol compound is dissolved in an organic solvent substantially immiscible with water, the solution of the methylol compound being emulsified in an aqueous alkaline medium containing an alkaline-soluble reaction product of acid casein with ethylene oxide.

22. A stable aqueous emulsion of a hardenable water-insoluble organic solvent-soluble methylol compound of melamine in which methylol compound the oxygen atom of at least one methylol group is bound to an acyl group of a fatty acid having more than 8 carbon atoms and which methylol compound is dissolved in an organic solvent substantially immiscible with water, the solution of the methylol compound being emulsified in an aqueous alkaline medium containing an alkaline-soluble reaction product of a protein with a 1,2-epoxy compound selected from the group consisting of ethylene oxide, propylene oxide and epichlorhydrin.

23. A stable aqueous emulsion of a hardenable water-insoluble organic solvent-soluble methylol compound of melamine in which methylol compound the oxygen atom of at least one methylol group is bound to an acyl group of a fatty acid having more than 17 carbon atoms and which methylol compound is dissolved in an organic solvent substantially immiscible with water, the solution of the methylol compound being emulsified in an aqueous alkaline medium containing an alkaline-soluble reaction product of a protein with a 1,2-epoxy compound selected from the group consisting of ethylene oxide, propylene oxide and epichlorhydrin.

24. A stable aqueous emulsion of a hardenable water-insoluble organic solvent soluble methylol compound of melamine in which methylol compound the oxygen atom of at least one methylol group is bound to an acyl group of a fatty acid having more than 17 carbon atoms and which methylol compound is dissolved in an organic solvent substantially immiscible with water, the solution of the methylol compound being emulsified in an aqueous alkaline medium containing an alkaline-soluble reaction product of acid casein with ethylene oxide.

References Cited in the file of this patent

UNITED STATES PATENTS

| Number | Name | Date |
| --- | --- | --- |
| 1,979,601 | Bauer et al. | Nov. 6, 1934 |
| 2,370,362 | Light | Feb. 27, 1945 |